United States Patent
Itoh et al.

(10) Patent No.: US 7,055,635 B2
(45) Date of Patent: Jun. 6, 2006

(54) ELECTRIC POWER REGENERATION CONTROLLER FOR HYBRID VEHICLE

(75) Inventors: Yoshiki Itoh, Shizuoka-ken (JP); Tatsuji Mori, Shizuoka-ken (JP); Norihiro Noda, Shizuoka-ken (JP)

(73) Assignee: Suzuki Motor Corporation, Hamamatsu (JP)

( * ) Notice: Subject to any disclaimer, the term of this patent is extended or adjusted under 35 U.S.C. 154(b) by 171 days.

(21) Appl. No.: 10/760,837

(22) Filed: Jan. 20, 2004

(65) Prior Publication Data

US 2004/0149502 A1    Aug. 5, 2004

(30) Foreign Application Priority Data

Jan. 21, 2003   (JP)   ............................ 2003-012130

(51) Int. Cl.
*B60K 6/04* (2006.01)

(52) U.S. Cl. .................... 180/65.2; 180/65.3; 903/914

(58) Field of Classification Search .............. 180/65.1, 180/65.2, 65.3, 65.4; 701/22, 48, 70
See application file for complete search history.

(56) References Cited

U.S. PATENT DOCUMENTS 4,730,709 A * 3/1988 Kawata et al. ............. 192/3.31

2002/0134596 A1 * 9/2002 Morimoto et al. ......... 180/65.2

FOREIGN PATENT DOCUMENTS

| JP | 08-105510 | 4/1996 |
|----|-----------|--------|
| JP | 2000-134713 | 5/2000 |
| JP | 2000134713 A * | 5/2000 |
| JP | 2000-170903 | 6/2000 |

* cited by examiner

*Primary Examiner*—Christopher P. Ellis
*Assistant Examiner*—John Walters
(74) *Attorney, Agent, or Firm*—Flynn, Thiel, Boutell & Tanis, P.C.

(57) ABSTRACT

An electric power regeneration control unit is provided for a hybrid vehicle. A motor generator is operated by a driving force received from an engine or drive wheels. A lockup clutch engages or disengages rotational members on input and output sides of a fluid torque converter, and is engaged or partially engaged after canceling fuel cut and increasing intake air quantity for the engine when an accelerator is released within a predetermined range A controller enables the motor generator to generate electric power when the accelerator is below a certain opening angle. An engagement finish determining device determines whether engagement of the lockup clutch is finished. The controller controls to prevent fuel cut, discontinue an increase in intake air quantity and starts electric power generation if the engagement finish determining device determines that lockup clutch engagement is finished.

8 Claims, 5 Drawing Sheets

ELECTRIC POWER REGENERATION CONTROLLER FOR HYBRID VEHICLE

FIELD OF THE INVENTION

This invention relates to an electric power regeneration controller for a hybrid vehicle in which a motor in connection with a crankshaft of an engine functions as a generator during deceleration of the vehicle to collect the kinetic energy of the vehicle, and more particularly to an electric power regeneration controller for a hybrid vehicle to control regenerative torque in a system combined with an automatic transmission equipped with a torque converter having a lockup mechanism.

BACKGROUND OF THE INVENTION

In vehicles, there is a so-called hybrid vehicle having an internal combustion engine and a motor generator as a power source. In this hybrid vehicle, the engine is directly connected to the motor generator that drives and assists the engine. The motor generator is controlled to drive and assist by a controller based on states of driving of the hybrid vehicle and the engine. This basic arrangement is disclosed in JP Application Laid-Open No. 2000-170903.

In a conventional power regenerating controller for a hybrid vehicle, the hybrid vehicle is equipped with a motor (also referred to as "motor generator") as well as an internal combustion engine to improve fuel economy. One example is disclosed in Japanese Application Laid-Open No. 2000-134713. In this application, a lockup clutch of a torque converter is controlled to be disengaged when regenerative braking is started or canceled. Thereby, the shock can be prevented, since the transferring of driving force is switched from mechanical to fluid transmission when the regenerative braking is started or stopped.

However, as shown in Japanese Application 08-105510, in a driven state of the engine, centrifugal force that is applied to hydraulic oil on an input side of the torque converter is smaller than that applied to hydraulic oil on an output side. Therefore the pressure to disengage the lockup clutch becomes higher than the pressure to engage. Accordingly, it is difficult to bring the lockup clutch to change from a disengagement state to an engagement state. To deal with this problem, beginning of fuel cut of the engine is delayed, or intake air quantity is increased temporarily by operation of a throttle valve so as to prevent the engine from the driven state to engage the lockup clutch.

If the regenerative braking is performed with the lockup clutch disengaged as in the above-mentioned Japanese Application Laid-Open No. 2000-134713, the engine speed sharply decreases by the added regenerative torque, and it is difficult to engage the lockup clutch again. Therefore, fuel cut must be canceled at an earlier stage, which undesirably increases fuel consumption.

Also, since the lockup clutch is not engaged, the engine speed sharply decreases and the regenerative electric power also undesirably decreases.

To deal with this problem, after beginning of the regenerative braking, the quantity of the intake air for the engine is controlled to maintain such that the lockup clutch of the torque converter can be engaged. That is, the intake air quantity should be increased by the quantity that the regenerative torque is added. However, this results in an undesirable increase in fuel consumption.

SUMMARY OF THE INVENTION

In order to obviate or minimize the above-mentioned inconvenience, the present invention provides an electric power regeneration control unit for a hybrid vehicle having a motor generator, a fluid torque converter, a lockup clutch, and a controller. The motor generator functions as a generator operated by driving force received from an engine or drive wheels. The fluid torque converter is disposed between the motor generator and the drive wheels. The lockup clutch engages or disengages rotational members on input and output sides of the fluid torque converter, and is engaged or partially engaged after canceling fuel cut and increasing intake air quantity for the engine when an accelerator pedal is released within a range in which the lockup clutch can be engaged or disengaged. The controller permits the motor generator to regenerate electric power by the force received from the drive wheels when the accelerator is below a certain opening angle. In this control unit, the controller is provided with an engagement finish determining device to determine whether engagement of the lockup clutch is finished. The controller controls such that both the canceling of fuel cut and the increase in intake air quantity are discontinued and the motor generator starts to generate electric power if the engagement finish determining device determines that engagement of the lockup clutch is finished. This reduces intake air quantity that was conventionally increased to maintain the engine in a driving state during lockup, thereby reducing fuel consumption.

BRIEF DESCRIPTION OF THE DRAWINGS

FIGS. 4(a)–4(f) represent a time chart of the electric power regeneration control unit for the hybrid vehicle, wherein FIG. 4(a) is a time chart of the engine speed, FIG. 4(b) is a time chart of the torque, FIG. 4(c) shows the quantity intake air increases, FIG. 4(d) is a time chart for fuel cut, FIG. 4(e) is a time chart for a lockup clutch, and FIG. 4(f) is a time chart of throttle opening angle.

DETAILED DESCRIPTION

Operation of an embodiment of the present invention is described as follows with reference to drawings.

Figure 1:
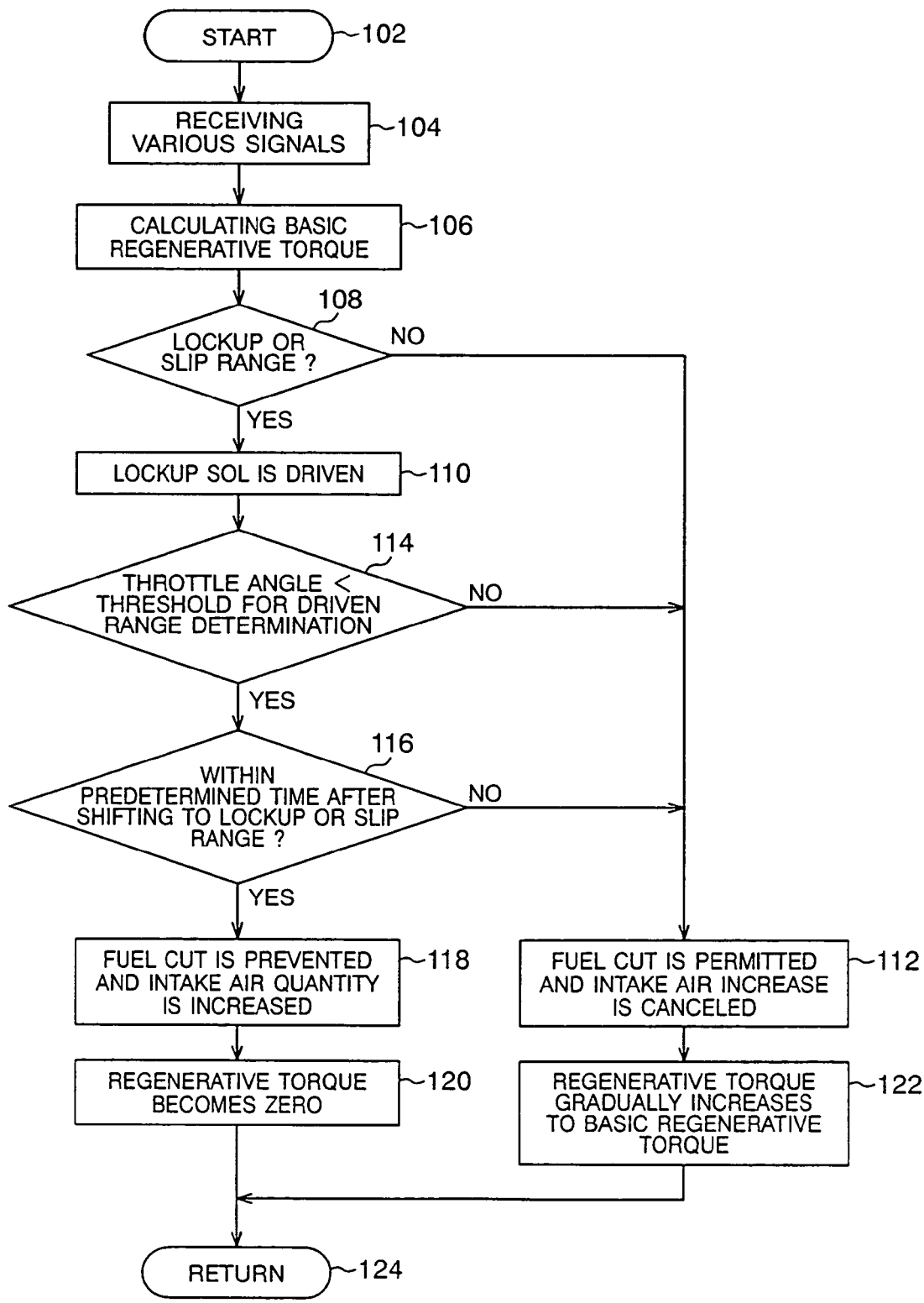
FIG. 1 is a flowchart for control of an electric power regeneration control unit for a hybrid vehicle according to an embodiment of the present invention.
Figure 2:
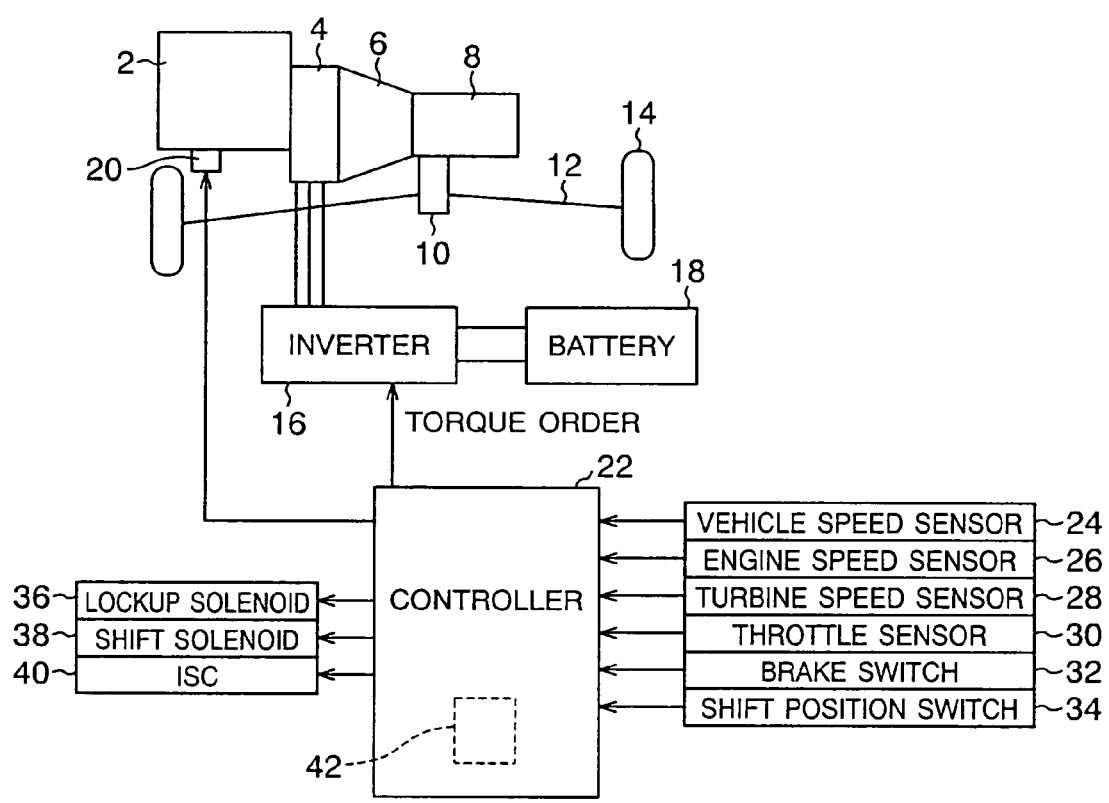
FIG. 2 is a schematic diagram showing a system of the electric power regeneration control unit for the hybrid vehicle.

FIGS. 1–6 illustrate the embodiment of the present invention. FIG. 2 shows an engine mounted on, e.g., a hybrid vehicle (not shown).

In this hybrid vehicle (not shown), the engine 2 is directly connected to a motor generator 4 that also functions as a generator driven by the force received from drive wheels 14. The motor generator 4 is directly connected to an automatic transmission 8 equipped with a fluid torque converter 6. A lockup clutch (not shown) engages or disengages rotational members (not shown) on input and output sides of the fluid torque converter 6. This lockup clutch has a slip range and a lockup range, as indicated by lockup lines defined by the vehicle speed and the throttle opening angle in FIG. 6.

The motor generator 4 functions as a motor which is capable of driving and assisting the engine 2 in driving, and as a generator.

The automatic transmission 8 is a transmission that can change speeds by hydraulic oil control. Also, the automatic transmission 8 is provided with a differential 10 in connection with drive wheels 14 through drive shafts 12.

The motor generator 4 is connected to a battery 18 through an inverter 16. The engine 2 is equipped with a fuel injector 20 that includes a fuel injection valve.

The injector 20 and the inverter 16 are connected to a controller 22. The controller 22 is connected to, on an input side thereof, a vehicle speed sensor 24 to detect the vehicle speed, an engine speed sensor 26 to detect the rotational speed of the engine, a turbine rotational speed sensor 28 to detect the rotational speed of a turbine (not shown) in the torque converter 6, a throttle sensor 30 to detect throttle angle, a brake switch 32 to detect a state in which a brake pedal (not shown) is depressed, and a shift lever position switch 34 to detect a location of a shift lever (not shown).

Further, the controller 22 is connected to, on an output side thereof, a lockup solenoid (also referred to as "lockup SOL") 36 that forms a part of the lockup clutch, a shift solenoid (also referred to as "shift SOL") 38, and an ISC valve (idle speed control valve) 40.

If an accelerator (not shown) is released in a range in which the lockup clutch is engaged or partially or half engaged, the controller 22 cancels the fuel cut and increases the intake air quantity for the engine 2 so as to permit the lockup clutch to be engaged or partially engaged. If the accelerator is below a certain degree, the controller 22 enables the motor generator 4 to generate electric power while utilizing the force received from the drive wheels 14.

Also the controller 22 includes therein an engagement finish determining device 42 to determine whether engagement of the lockup clutch is finished. If the engagement finish determining device 42 determines that engagement of the lockup clutch is finished, then the canceling of the fuel cut and the increasing in the intake air quantity both are prevented, and the motor generator 4 begins to generate the electric power.

More particularly, the engagement finish determining device 42 determines that engagement of the lockup clutch is finished if a predetermined time has elapsed from the beginning of engagement of the lockup clutch.

Figure 4:
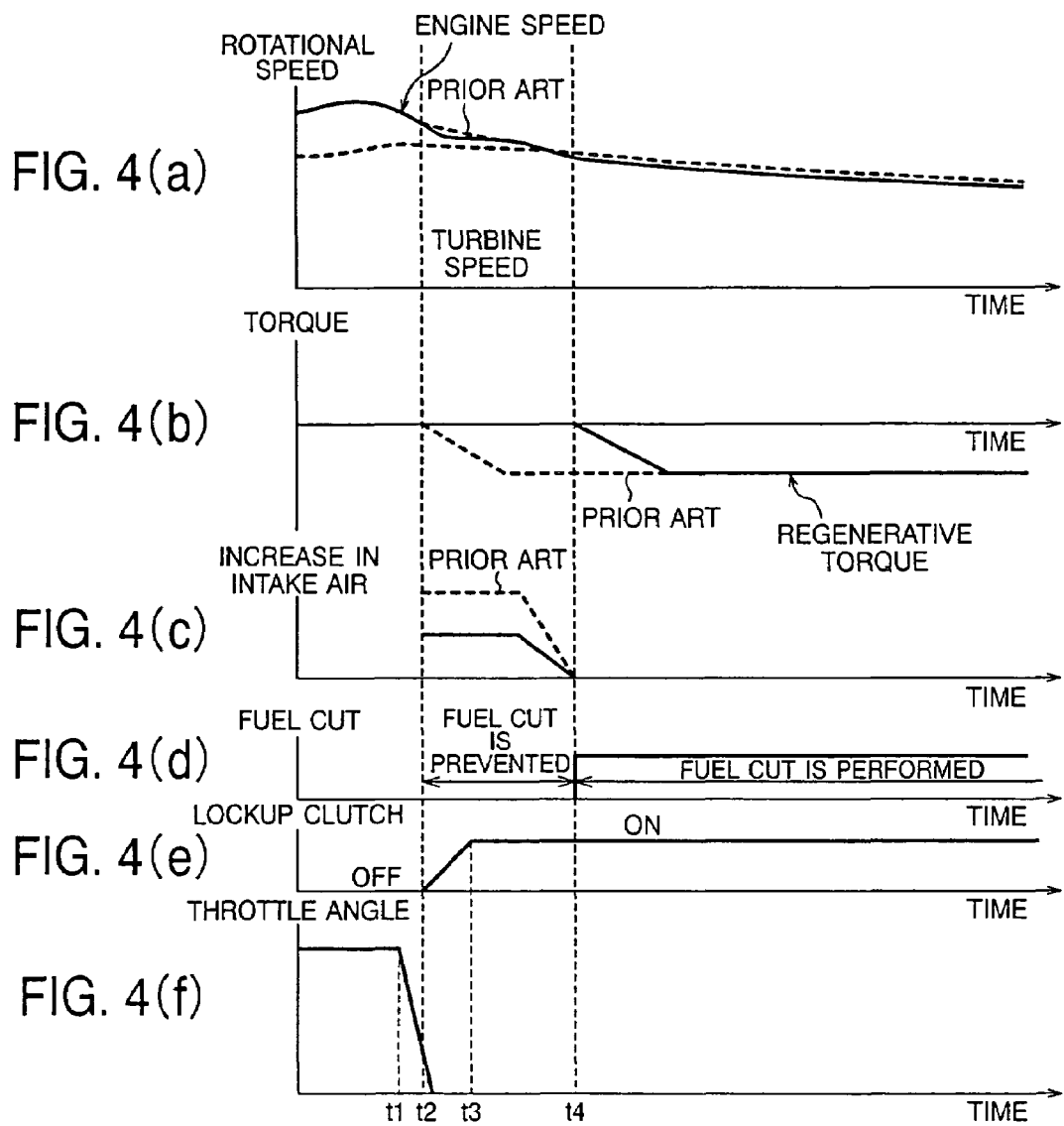

More particularly, in FIG. 4, "t1" is the time at which the throttle angle starts to decrease, "t2" is the time at which the lockup clutch starts to engage, "t3" is the time at which engagement of the lockup clutch is finished, and "t4" is the time shifting from no fuel cut to performance of the fuel cut. The determination by the determining device 42 is based on, not the time from "t2" to "t3", but the predetermined time elapsed from the beginning of engagement of the lockup clutch, i.e. the time from "t2" to "t4". It is determined that engagement of the lockup clutch is finished if the time from "t2" to "t4" has elapsed.

It is noted that beginning of drive of the lockup solenoid 36 may be recognized as the beginning of engagement of the lockup clutch.

At this time, the power regeneration starts after the lockup clutch is engaged with the accelerator released. The lockup clutch can be engaged without increase in the intake air quantity, which reduces fuel consumption and improves fuel economy.

In addition, when the regeneration starts after the lockup clutch is engaged, the regenerative torque is controlled to increase gradually so as to prevent sharp increase in regenerative power due to the regeneration.

Figure 3:
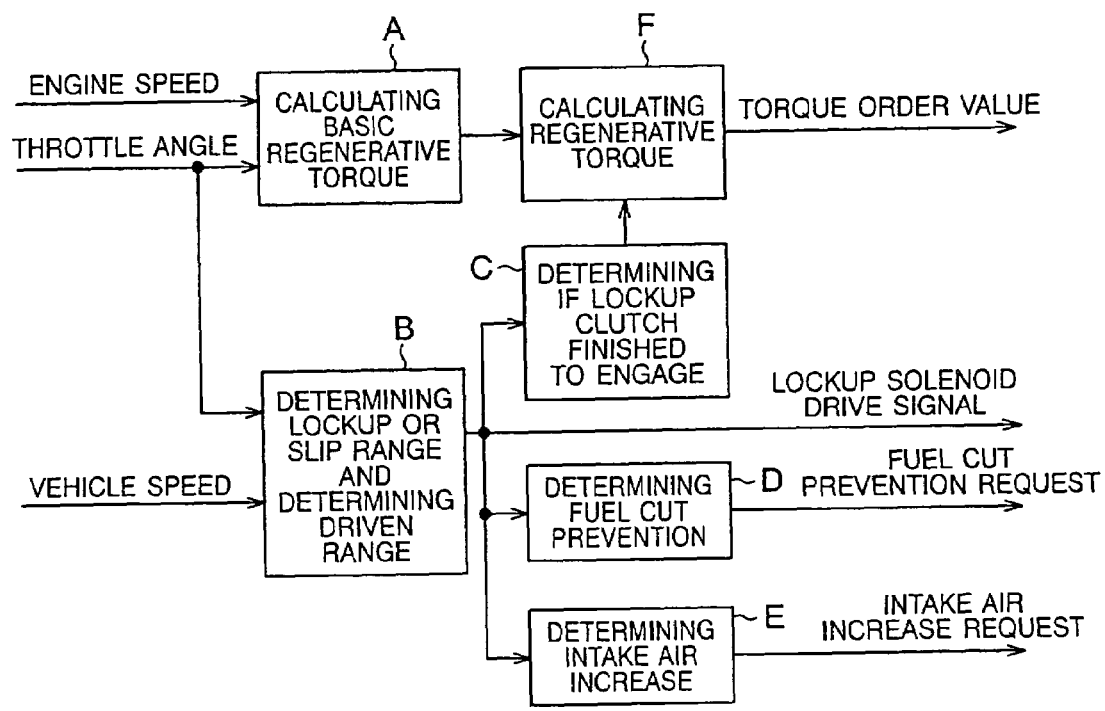
FIG. 3 is a block diagram for a controller.

Control of the controller 22 is described below with reference to FIG. 3.

Figure 5:
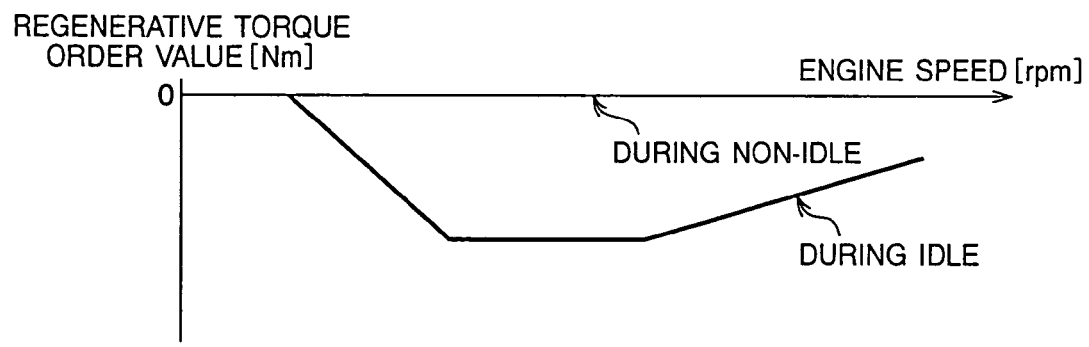
FIG. 5 is a table to calculate basic regenerative torque.
Figure 6:
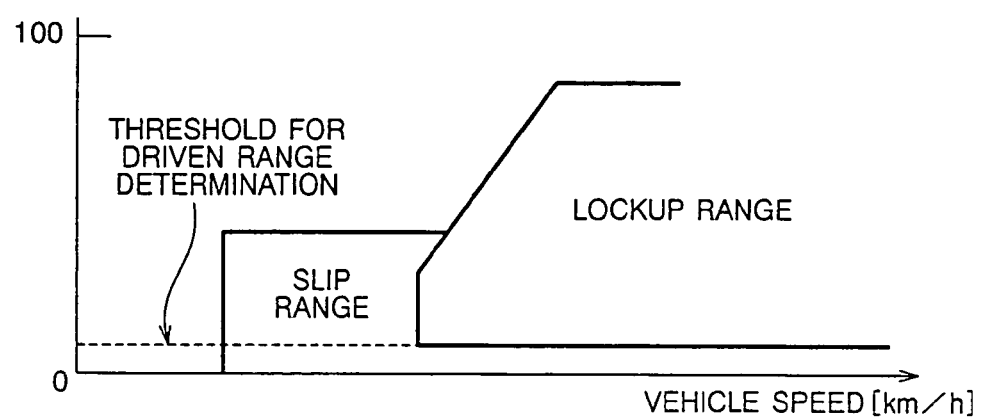
FIG. 6 is a diagram with regard to lockup.

A basic regenerative torque calculating process A calculates basic regenerative torque based on the engine speed output from the engine speed sensor 26 and the throttle angle from the throttle sensor 30 with reference to a calculation table shown in FIG. 5.

A process B determines whether the lockup clutch is in the lockup or slip control ranges and determines whether in a driven range based on the vehicle speed output from the vehicle speed sensor 24 and the throttle angle from the throttle sensor 30.

This process B outputs a signal to drive the lockup solenoid 36, and is followed by a lockup clutch engage finish determining process C, a fuel cut prevention determining process D to output a request for canceling the fuel cut, and an intake air increase determining process E to output a request to increase intake air.

After the processes A and C, a regenerative torque calculating process F calculates a regenerative toque and outputs a torque order value to the inverter 16.

Operation of the controller for the hybrid vehicle is described below with reference to the flowchart in FIG. 1.

A control program for the controller for the hybrid vehicle starts at step 102. Then the controller receives signals from various sensors 24, 26, 28, 30 and switches 32, 34 at step 104.

The basic regenerative torque is calculated at step 106 based on the engine speed output from the engine speed sensor 26 and the throttle angle from the throttle sensor 30 with reference to the calculation table of FIG. 5. Then a determination is made at step 108 whether the lockup clutch is in the lockup range or the slip range.

If the determination at step 108 is "YES", then the lockup solenoid 36 is driven at step 110. If the determination at step 108 is "NO", the fuel cut is permitted and the increase in intake air is canceled at step 112.

After the lockup solenoid 36 is driven at step 110, a determination is made at step 114 whether the throttle angle output from the throttle sensor 30 is below a threshold angle for fuel cut determination. If the determination at step 114 is "YES", another determination is made at step 116 whether the predetermined time has not elapsed yet after the lockup clutch is shifted to lockup or slip ranges.

If the determination at step 116 is "YES", the fuel cut is prevented and the intake air quantity is increased at step 118. If the determination at step 114 or 116 is "NO", then the fuel cut is permitted and increase of the intake air is canceled at step 112.

Further, after the fuel cut is prevented and the intake air is increased at step 118, the regenerative torque becomes zero at step 120 and the program returns at step 124.

After the fuel cut is permitted and the increase of the intake air is canceled at step 112, the regenerative torque is gradually increased to the basic regenerative torque, and the program returns at step 124.

When the lockup clutch is engaged or partially engaged with the accelerator released in the lockup or slip range, the motor generator 4 is controlled to start to generate the electric power after it is determined that engagement of the lockup clutch is finished, so that the intake air quantity increase to maintain the engine 2 in the drive state can be reduced and therefore the fuel consumption is reduced.

Also, the engagement finish determining device 42 determines that the operation of the lockup clutch is finished if the predetermined time has elapsed from the beginning of the engage operation of the lockup clutch. The finish of the lockup clutch operation can be determined without the sensors, which is advantageous in practical use.

The present invention is not limited to the above-mentioned embodiment, but is adaptable for various applications and variations or modifications.

According to the present invention, the engagement of the lockup clutch is determined by the time elapsed from the driving of the lockup solenoid. Other factors can also be employed for this system.

That is, engagement of the lockup clutch can be determined from the difference between the engine speed and the turbine rotational speed, instead of the time elapsed from the drive of the lockup solenoid.

Also, engagement of the lockup clutch can be determined from the time elapsed from the drive of the lockup solenoid along with the difference between the engine speed and the turbine rotational speed.

Thereby, the intake air quantity increase to maintain the engine in the drive state can be reduced and therefore the fuel consumption is reduced.

In addition, according to the above-mentioned embodiment, the engagement finish determining device determines the predetermined time elapsed from the beginning of the engagement of the lockup clutch. However, the predetermined time can be changed as a special configuration. That is, the predetermined time can be changed according to the rate of change of throttle angle output from the throttle sensor or engine speed output from the engine speed sensor.

The engagement finish determining device, which can be within the controller, can effectively determine or calculate the predetermined time set according to the rate of change of throttle opening or engine speed, which is advantageous in practical use.

What is claimed:

1. An electric power regeneration control unit for a hybrid vehicle having an internal combustion engine receiving fuel and an intake air quantity, a motor generator which functions as a generator operated by driving force received from the internal combustion engine or drive wheels, a fluid torque converter disposed between said motor generator and said drive wheels, a lockup clutch to engage or disengage rotational members on input and output sides of said fluid torque converter, said lockup clutch being engaged or partially engaged after preventing the fuel cut and increasing intake air quantity for said engine when an accelerator is released within a range in which said lockup clutch can be engaged or disengaged, and a controller to permit said motor generator to generate electric power by the force received from said drive wheels when said accelerator is below a certain opening angle, wherein said controller is provided with an engagement finish determining device to determine whether engagement of said lockup clutch is finished, and said controller controls such that both the prevention of fuel cut and increase in intake air quantity are discontinued and said motor generator starts to generate electric power if said engagement finish determining device determines that engagement of said lockup clutch is finished.

2. The electric power regeneration controller for the hybrid vehicle as defined in claim 1, wherein said engagement finish determining device determines whether a predetermined time has elapsed from the beginning of engagement of said lockup clutch, and decides that engagement of said lockup clutch is finished if said predetermined time has elapsed.

3. A method for controlling fuel supply for a hybrid vehicle having an internal combustion engine that receives intake air and a motor generator that drives and assists said engine, a fluid torque converter disposed between said engine and said motor generator, and a lockup clutch for engaging/disengaging rotational members on input and output sides of said fluid torque converter, said method comprising:

determining if the lockup clutch is in a lockup range or a slip range and permitting a fuel cut when the lockup clutch is out of the lockup range and the slip range;

measuring a throttle angle of an accelerator to determine if the throttle angle is below a predetermined opening angle;

determining when engagement of the lockup clutch is finished; and preventing the fuel cut and increasing the intake air when the throttle angle is less than the predetermined opening angle and engagement of the lockup clutch is not determined to be finished.

4. The method according to claim 3, wherein the step of determining when engagement of the lockup clutch is finished comprises determining if a predetermined time has elapsed since the lockup clutch was shifted to the lockup range or the slip range.

5. The method according to claim 3, wherein the step of determining when the engagement of the lockup clutch is finished comprises determining a difference between engine speed and turbine rotational speed.

6. The method according to claim 3, including generating electric power with the motor generator after determining that the throttle angle is below a certain throttle angle and after determining that the lockup clutch is engaged.

7. The method according to claim 3, including driving a lockup solenoid of the lockup clutch when the lockup clutch is in the lockup range or the slip range.

8. The method according to claim 3, including the step of discontinuing the preventing of the fuel cut and the increasing of the air intake if the engagement of the lockup clutch is determined to be finished.

\* \* \* \* \*